United States Patent
Nakarai et al.

(10) Patent No.: US 9,446,380 B2
(45) Date of Patent: Sep. 20, 2016

(54) WATER-BLOCKING FILLER AND FILLER FOR ENGINEERED MULTI-BARRIERS USING SAID WATER-BLOCKING FILLER

(75) Inventors: Kenichiro Nakarai, Gunma (JP); Kiyoshi Koibuchi, Kanagawa (JP); Nobukazu Nito, Kanagawa (JP)

(73) Assignees: GUNMA UNIVERSITY, Gunma (JP); DC CO., LTD., Kanagawa (JP)

( * ) Notice: Subject to any disclaimer, the term of this patent is extended or adjusted under 35 U.S.C. 154(b) by 0 days.

(21) Appl. No.: 14/112,076

(22) PCT Filed: Oct. 26, 2011

(86) PCT No.: PCT/JP2011/074606
§ 371 (c)(1),
(2), (4) Date: Oct. 16, 2013

(87) PCT Pub. No.: WO2012/144099
PCT Pub. Date: Oct. 26, 2012

(65) Prior Publication Data
US 2014/0034875 A1  Feb. 6, 2014

(30) Foreign Application Priority Data
Apr. 18, 2011  (JP) ................. 2011-091713

(51) Int. Cl.
| | |
|---|---|
| B01J 20/12 | (2006.01) |
| G21F 9/34 | (2006.01) |
| G21F 9/36 | (2006.01) |
| B09B 3/00 | (2006.01) |
| G21F 9/16 | (2006.01) |

(52) U.S. Cl.
CPC .............. *B01J 20/12* (2013.01); *B09B 3/0041* (2013.01); *G21F 9/162* (2013.01); *G21F 9/34* (2013.01); *G21F 9/36* (2013.01)

(58) Field of Classification Search
CPC ................................ B01J 20/12; G21F 9/36
See application file for complete search history.

(56) References Cited

U.S. PATENT DOCUMENTS

| 4,950,426 A | 8/1990 | Markowitz et al. |
| 8,647,015 B2 * | 2/2014 | Nakarai et al. .......... 405/129.45 |

(Continued)

FOREIGN PATENT DOCUMENTS

| JP | H02287199 A | 11/1990 |
| JP | 2001002956 A | 1/2001 |
| JP | 3984088 B2 | 10/2003 |

(Continued)

OTHER PUBLICATIONS

English machine translation of Hiroshi, JP 2003-149391 A (2003).*

(Continued)

*Primary Examiner* — Peter F Godenschwager
(74) *Attorney, Agent, or Firm* — Pearne & Gordon LLP

(57) ABSTRACT

Provided are a water-blocking filler, the swelling properties of which do not decrease easily even when in contact with water containing calcium ions, and a filler for engineered multi-barriers with said water-blocking filler as the engineered multi-barrier filler. A water-blocking filler mainly comprising sodium bentonite obtained by mixing 30 weight % or less, in terms of inner percentage, of a pozzolan substance such as fly ash or silica fume with said bentonite, and a filler using said water-blocking filler that is used for engineered multi-barriers in radioactive waste disposal facilities.

3 Claims, 3 Drawing Sheets

(56) References Cited

U.S. PATENT DOCUMENTS

2008/0251755 A1* 10/2008 Matula ............... C04B 28/10
                                                                    252/71
2011/0097155 A1* 4/2011 Nakarai et al. ............ 405/129.7

FOREIGN PATENT DOCUMENTS

| | | |
|---|---|---|
| JP | 2003290734 A | 10/2003 |
| JP | 4096328 B2 | 6/2008 |
| JP | 2003149391 A | 6/2008 |
| JP | 2010038736 A | 2/2010 |
| JP | 2011208005 A | 10/2011 |
| WO | 2009/153957 A1 | 12/2009 |

OTHER PUBLICATIONS

Chizuru Shimakura and Kenichiro Nakarai: Suppressing Effect on Conversion of Fly Ash-Mixed Bentonite to Calcium Type, The 45th Geotechnical Engineering meeting for presenting research papers, Heisei-22 Summaries of Lectures, The Japanese Geotechnical Society, Jul. 15, 2010, No. 1/2, pp. 185-186.

* cited by examiner

WATER-BLOCKING FILLER AND FILLER FOR ENGINEERED MULTI-BARRIERS USING SAID WATER-BLOCKING FILLER

TECHNICAL FIELD

This invention relates to a water-blocking filler of non-cement based type mainly comprising bentonite, and also an engineered multi-barrier filler using the above water-blocking filler used for engineered multi-barriers in the radioactive waste disposal facilities.

BACKGROUND ARTS

Bentonite is not only some type of material excellent in water absorption performance but also has the functional effect of permitting a decrease in water permeability in such a manner that the bentonite gets swollen to cause water-permeable voids to be decreased. Besides, the bentonite belongs in natural clay minerals and is thus considered to be a stable material ensuring that material performances are maintainable for long periods. For that reason, the bentonite has been heretofore employed in various fields, that is, as liquid stabilizers for use in excavating works, grouting materials, cement slurry additives or like materials.

In recent years, in situations where industrial and/or radioactive waste disposals become an issue, considerable advances have been made in examinations on use of the bentonite as the material of water shields and/or fillers in the industrial or radioactive waste final disposal facilities. For instance, in Patent document 1, there is disclosed a water shield in which coal ash and bentonite are contained. Alternatively, in Patent document 2, there is disclosed a radioactive waste burial filler comprising bentonite, volcanic glass and fly ash.

There have been also other examinations on application of the bentonite to engineered multi-barriers in the radioactive waste disposal facilities for very long-term underground burial of the radioactive wastes. Each engineered multi-barrier of this type is arranged such that a low water-permeability layer or a buffering material mainly comprising high-swelling sodium type bentonite is adjacent to a cement-based material used as a radionuclide low-diffusion layer, a timbering or like material. With such engineered multi-barriers, however, the possibility exists that there would be the occurrence of leaching-out of calcium ions from the cement-based material due to very long-term contact with the underground water around the disposal facilities, resulting in the problem about bentonite alteration such as bentonite dissolution and conversion of sodium type bentonite to the calcium type by the action of the underground water containing the leached-out calcium ions, together with the problem about a bentonite swelling decrease attendant upon such bentonite alteration. Thus, in this connection, some energetic examinations are now in progress to overcome the above problems.

For instance, in Patent document 3, there is disclosed a repository structure in which a buffering layer consisting of a silica-based material is interposed in a boundary between a water-shielding layer supposed to be formed with a bentonite-based material layer and a structure material made up of a cement-based material layer including a mortar or concrete layer with hydraulic cement as a binder in order to prevent the penetration of calcium ions from the above cement-based material layer into the bentonite-based material layer in the manner of causing calcium silicate to be produced in the buffering layer. Alternatively, in Patent document 4, there is disclosed a low water-permeability layer material obtained by adding sodium bicarbonate or sodium carbonate to sodium type bentonite.

REFERENCE DOCUMENTS ON PRIOR ARTS

Patent Documents

Patent document 1: Japanese Unexamined Patent Application Publication No. 2001-2956
Patent document 2: Japanese Patent No. 4096328
Patent document 3: Japanese Patent No. 3984088
Patent document 4: WO No. 2009/153957

SUMMARY OF THE INVENTION

Problems to be Solved by the Invention

As described the above, there are some known water shields and/or fillers each obtained using the bentonite. It is to be understood, however, that each of the above known water shields and/or fillers neither mainly comprises the sodium type bentonite nor is provided in consideration of the bentonite alteration caused by the calcium ions, resulting in no easy application to the engineered multi-barriers. With a method disclosed in Patent document 3, it is necessary not only to slightly increase the repository structure size but also to newly provide a silica-based material layer using a silica-based material in large quantities, resulting in the problems about much time for execution of works and an increase in cost. With a method disclosed in Patent document 4, it can be satisfactorily expected that the conversion of sodium type bentonite to the calcium type and/or the bentonite deterioration will be suppressed, in which case, however, there is no reason that the bentonite swelling decrease caused by the calcium ions can be suppressed. Besides, it cannot be always said that the satisfactory results will be expected to be obtainable in the aspect of an increase in dynamical stability of the bentonite.

The present invention is aimed at overcoming the above problems, more specifically, its object is to provide a water-blocking filler which permits not only no easy occurrence of a decrease in swelling even when being in contact with water containing calcium ions but also the attainment of increased dynamical stability, and also an engineered multi-barrier filler in which the above water-blocking filler is used as a low water-permeability layer filler for engineered multi-barriers.

Means for Solving the Problems

A water-blocking filler relating to claim 1 of the present invention is defined as "a water-blocking filler mainly comprising sodium type bentonite, wherein 30% by weight of less, in terms of inner percentage, of a pozzolan substance is mixed with the above bentonite".

The sodium type bentonite has high swelling power and is thus suited for use in blocking of water. The pozzolan substance has a pozzolan activity to permit reaction with calcium ions to produce calcium silicate and is thus effective in suppressing the bentonite alteration caused by the conversion of sodium type bentonite to the calcium type.

The pozzolan substance-mixed amount is desirably 30% by weight or less, in terms of the inner percentage, to the above bentonite. No pozzolan substance inclusion fails to sufficiently suppress the bentonite alteration caused by the conversion of sodium type bentonite to the calcium type, resulting in that the presence of calcium ions will cause the water-blocking filler to decrease in swelling.

In contrast with the above, more than 30% by weight of the pozzolan substance comes to provide the water-blocking filler in which the sodium type bentonite content thereof becomes insufficient, resulting in no attainment of satisfactory water-blocking performance. The present invention does not particularly impose limitations on the lower limit of the pozzolan substance-mixed amount. In this connection, it is confirmed that even 1% by weight of the pozzolan substance is allowed to produce the satisfactory suppressing results. From the point of view of the need to ensure an absolute amount of swelling, the more desirable pozzolan substance-mixed amount is as much as 20% by weight or less.

The water-blocking filler of the present invention is of non-cement based type and hence does not have high solidification strength, in which case, however, the presence of calcium ions will be allowed to provide slight solidification by a pozzolan reaction with the calcium ions, resulting in the attainment of slightly increased dynamical stability after filling of the above filler.

The water-blocking filler of the present invention is allowable to be used as such materials as grouting materials, waste disposal materials for the wastes including heavy metal or like harmful substances and fillers for use in the radioactive waste disposal facilities.

The water-blocking filler relating to Claim 2 of the present invention is defined as "the water-blocking filler according to Claim 2, wherein the above pozzolan substance includes either fly ash or silica fume.

Although there are various types of pozzolan substances such as fly ash, silica fume, diatomaceous earth, rice husk ash, activated clay, blast-furnace slag and blast-furnace fume, it is desirable to employ some type of pozzolan substance having high pozzolan reactivity. It is to be understood, however, that the blast-furnace slag or like pozzolan substance having a latent hydraulic property is undesirable because of the appearance of too much increased solidification strength so that the sodium type bentonite will be restrained from getting swollen. Among the above pozzolan substances, the fly ash and the silica fume both obtainable as the industrial by-products are considered to be desirable from the points of view of the high pozzolan activity, the slight solidifying power, the stabled quality and supply, the environmental loading reduction thanks to industrial by-product reuses and so on.

An engineered multi-barrier filler relating to Claim 3 of the present invention is defined as "an engineered multi-barrier filler obtained using the water-blocking filler according to Claim 1 or 2, wherein the above engineered multi-barrier filler is used for engineered multi-barriers in the radioactive waste disposal facilities".

As described the above, the water-blocking filler of the present invention is allowable to be employed in various fields, or among others, desirably suited to a low water-permeability layer for the engineered multi-barriers in the radioactive waste disposal facilities. It is noted herein that the water-blocking filler of the present invention be supposed to be defined as the exclusive filler for the engineered multi-barriers. It can be thus considered that use of the engineered multi-barrier filler of the present invention would be allowed to provide such a low water-permeability layer as permitting no occurrence of the swelling power decrease caused by the action of the calcium ions leaching out from the cement-based material adjacent to the low water-permeability layer.

Effects of the Invention

It would be appreciated that the water-blocking filler of the present invention would permit no easy occurrence of the decrease in swelling even when being in contact with the water containing the calcium ions, and would be thus desirably used as such materials as fillers for use in each low water-permeability layer (or water-shielding layer) adjacent to a concrete or like cement-based material-made layer and/or structure material and water-blocking grouting materials for use in places supposed to easily undergo the action of the underground water containing the calcium ions.

It would be appreciated also that use of the engineered multi-barrier filler of the present invention would bring about easily the settlement of the problem about the bentonite performance decrease as in the case of engineered multi-barrier constructions, and would be thus allowed to provide an excellent low water-permeability layer.

BEST MODE FOR CARRYING OUT THE INVENTION

Figure 1:
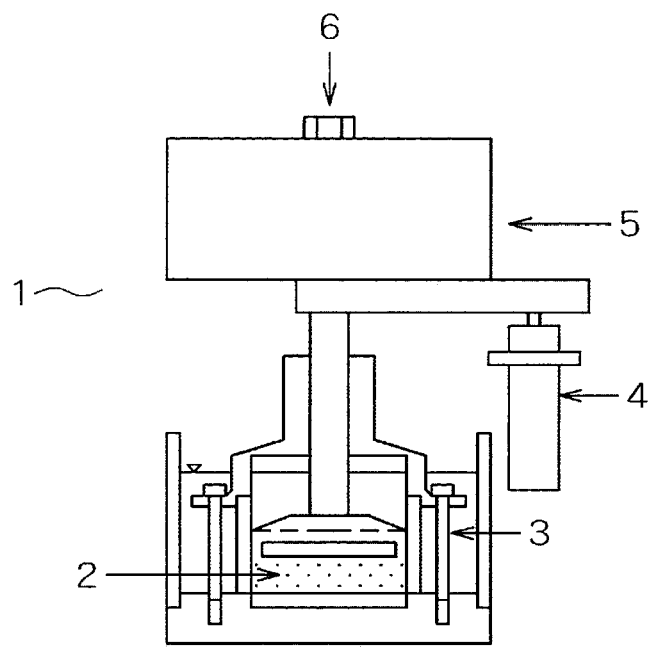
FIG. 1 is a view showing an outline of a swelling deformation testing apparatus.

Hereinafter will be described the present invention in more detail.

A. Water-Blocking Filler

A water-blocking filler of the present invention is of non-cement based type mainly comprising sodium type bentonite, wherein a pozzolan substance is contained to permit no easy occurrence of a swelling power decrease caused by the bentonite alteration due to the conversion of sodium type bentonite to the calcium type by the action of calcium ions. Also, this water-blocking filler exhibits a water-blocking property in such a manner that the bentonite gets swollen to cause water-permeable voids to be decreased. Besides, this water-blocking filler ensures that the presence of calcium ions is allowed to provide slight solidification by the pozzolan reaction of calcium ions with the pozzolan substance and/or the reaction of calcium ions with aluminum contents in the pozzolan substance.

The bentonite is a kind of clay mineral made up as the result of alterations of the volcanic ash and/or lava deposits on the sea and/or lake bottom, the main component of which is montmorillonite, and others such as quartz, mica, feldspar and zeolite are also contained therein. The bentonite is available in two types, sodium type and calcium type, which are different in their own characteristics. The reason why the present invention employs the sodium type bentonite is that the sodium type bentonite shows more excellent swelling as compared with the calcium type bentonite. It is to be understood, however, that owing to a cation exchanging property, the sodium type bentonite easily undergoes the conversion to the calcium type by the action of calcium ions to cause the decrease in swelling, so that it is necessary to shut up the action of calcium ions in order to maintain bentonite swelling.

The present invention adopts a pozzolan substance in order to shut up the above action of calcium ions. The pozzolan substance is made to act on the calcium ions in preference to others to cause the pozzolan reaction, which thus allows the conversion of sodium type bentonite to the calcium type to be suppressed. It is noted that the pozzolan reaction is to produce insoluble and hardening calcium silicate by the reaction of soluble silica with calcium hydroxide (or calcium ions), and such substances as easily causing the pozzolan reaction are called pozzolan substances.

Although there are various types of pozzolan substances as described the above, it is desirable from the points of view of the swelling decrease suppression and the dynamical stability that some type of pozzolan substance having high pozzolan activity and slight solidifying power as much as it causes no hindrance to bentonite swelling be employed in the present invention. For instance, fly ash, silica fume, metakaolin, allophane, activated clay, diatomaceous earth, rice husk ash, zeolite or like substances are included. Among the above pozzolan substances, both the fly ash and the silica fume are considered to be more desirable from the point of view of the environmental loading reduction thanks to industrial by-product reuses.

The fly ash is a kind of coal ash produced from a coal-fired power plant, more specifically, in the form of collected coal ash powder obtained by collecting fine coal ashes floating in pulverized coal boiler combustion exhaust gas using an electric dust collector. The fly ash has a pozzolan activity and is heretofore used as concrete admixture by reason that mixing such fly ash in concrete makes contributions to the attainment of improved workability, increased water tightness or the like. The fly ash qualities are prescribed by JIS A6201, wherein there are shown the fly ash quality standards I, II, III and IV in the order as I>II>III>IV. Although the present invention does not particularly impose limitations on the fly ash quality, use of fly ash having the quality meeting the standard requirements of II or above is desirable. Besides, although the present invention does not particularly impose limitations on the fly ash fineness, use of fly ash having the fineness of 3500 cm$^2$/g or above in terms of Blain value is desirable.

The silica fume is obtainable as the industrial by-product contained in exhaust gas generated at the time of metallic silicon and/or ferro-silicon refining with an arc-type electric furnace or like furnace, 80% or above components of which is amorphous $SiO_2$, and others such as $Al_2O_3$, $Fe_2O_3$, $CaO$ and $TiO_2$ are also contained as minorities therein. The silica fume is in the form of spherical particles having the average particle size of about 0.1 μm and has high pozzolan activity. It is noted that the present invention does not particularly impose limitations on the silica fume type Referring to the mixture ratio of sodium type bentonite to pozzolan substance in the water-blocking filler of the present invention, it is desirable to mix the pozzolan substance over the range up to 30% by weight or less, in terms of the inner percentage. From the point of view of the need to ensure the absolute amount of swelling, the more desirable pozzolan substance-mixed amount is as much as 20% by weight or less. It is noted that the pozzolan substance-mixed amount range varies depending on the pozzolan substance type.

For instance, in use of the fly ash as the pozzolan substance, the mixed amount thereof is desirably in the range of 10 to 20% by weight. Alternatively, in use of the silica fume or like pozzolan substance having high pozzolan activity, the smaller mixed amount thereof than the above is allowed to produce the satisfactory results. For instance, the silica fume-mixed amount as small as even 3% by weight or less will be also allowed to produce the satisfactory results.

No pozzolan substance inclusion fails to sufficiently suppress the bentonite alteration caused by the conversion of sodium type bentonite to the calcium type, resulting in some fear that the presence of calcium ions would cause the water-blocking filler to decrease in swelling. In contrast with the above, more than 30% by weight of the pozzolan substance comes to provide the water-blocking filler in which the sodium type bentonite content thereof becomes insufficient, resulting in no attainment of satisfactory water-blocking performance.

Manufacture of the water-blocking filler according to the present invention is given simply in the manner of mixing the sodium type bentonite and the pozzolan substance together at a predetermined mixture ratio using an existing mixer. The thus manufactured water-blocking filler is allowable to be used as such materials as grouting materials, waste treatment materials for wastes containing heavy metal or like harmful substances and fillers for use in the radioactive waste disposal facilities, or among others, desirably as fillers for engineered multi-barriers in the radioactive waste disposal facilities where it is feared that there would be some influence of the calcium ions supposed to leach out from the cement-based materials.

Next will be described some confirmation tests taken on the swelling performance under the calcium ion present conditions with respect to the water-blocking filler of the present invention.

[Confirmation Tests on Water-Blocking Filler Swelling Performance]

<Employing Materials>

Sodium type bentonite (Reference symbol Be); Kunigel-V1

Fly ash (Reference symbol FA); Product from Noshiro and equivalent to JIS II standards (3840 cm$^2$/g in Blain value, and 2.20 g/cm$^3$ in density)

Silica fume (Reference symbol SF); Product from Egypt

Powdery $Ca(OH)_2$ (Reference symbol CH); Guaranteed reagent

Water (Reference symbol W); Distilled water

<Swelling Performance Confirmation Tests>

1) Specimen

A predetermined mixture of materials was kneaded using an omni-mixer to prepare a sample. Moisture content adjustment was made using a spray gun. A specimen was subjected to pressure application of about 400 kPa from the upper end of the sample using a consolidation test apparatus, followed by being allowed to stand for several hours for static compaction. There was thus provided a cylindrical specimen having a diameter of 60 mm and a height of 5 mm, the dry density of which was adjusted to 1.30 g/cm$^3$ for easy evaluation of the deterioration, and the moisture content of which was also adjusted to 21.0%. The specimen types and the material mixtures are listed in Table 1.

2) Swelling Deformation Tests

Measurements on one-dimensional deformation quantity of the specimen under the fixed vertical pressure application conditions were made to evaluate the specimen swelling characteristics. The tests were taken under the environment at 40° C. in order to accelerate the pozzolan reaction. A container was placed in a location under the environment at 40° C., and afterwards, distilled water or saturated calcium hydroxide solution in room temperature conditions (40±5° C.) was poured into the container. From the time just before pouring of the solution, the measurements on one-dimensional deformation quantity ΔS of the specimen under the fixed vertical pressure application conditions (10 kPa) were made using a displacement meter with the elapse of time to estimate the maximum one-dimensional deformation quantity. The vertical pressure application was by applying a load in the manner of fixing a steel sheet to a container cap.

FIG. 1 shows the outline of a testing apparatus in use. The organized representation of the test results is given in terms of a swelling rate $\epsilon_s$ shown in the following expression.

$$\epsilon_s = \Delta S/H_0 \times 100$$

Where $\epsilon_s$ indicates a swelling rate, ΔS indicates one-dimensional deformation quantity of the specimen, and $H_0$ indicates an initial specimen height.

3) Test Results

Figure 2:
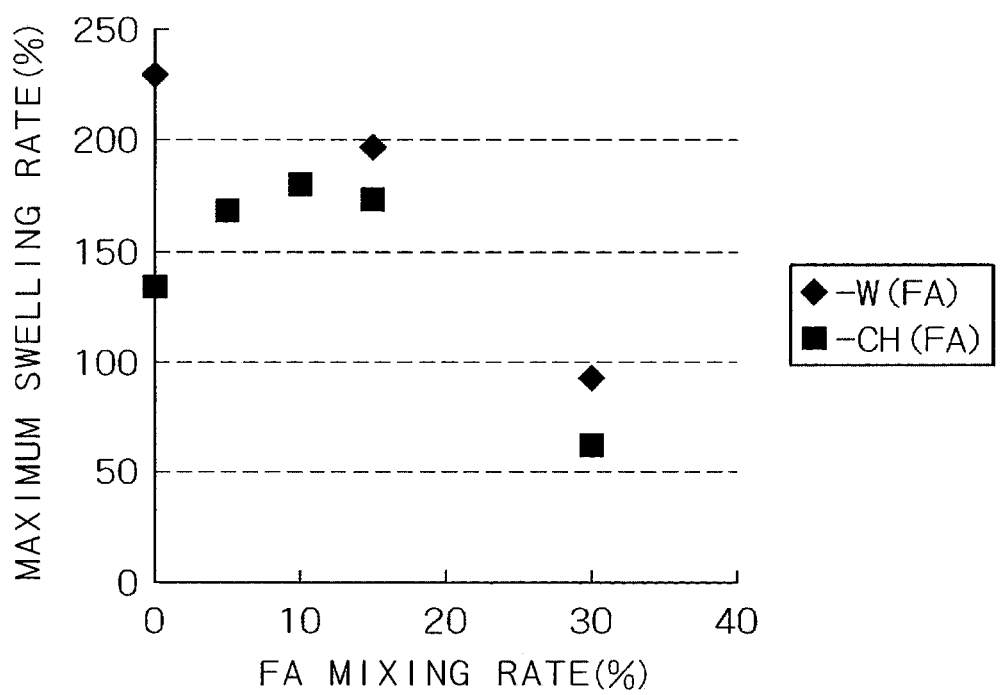
FIG. 2 is a graph showing the relation between the FA, SF mixing rate and the swelling rate under the saturated calcium hydroxide solution conditions.
Figure 3:
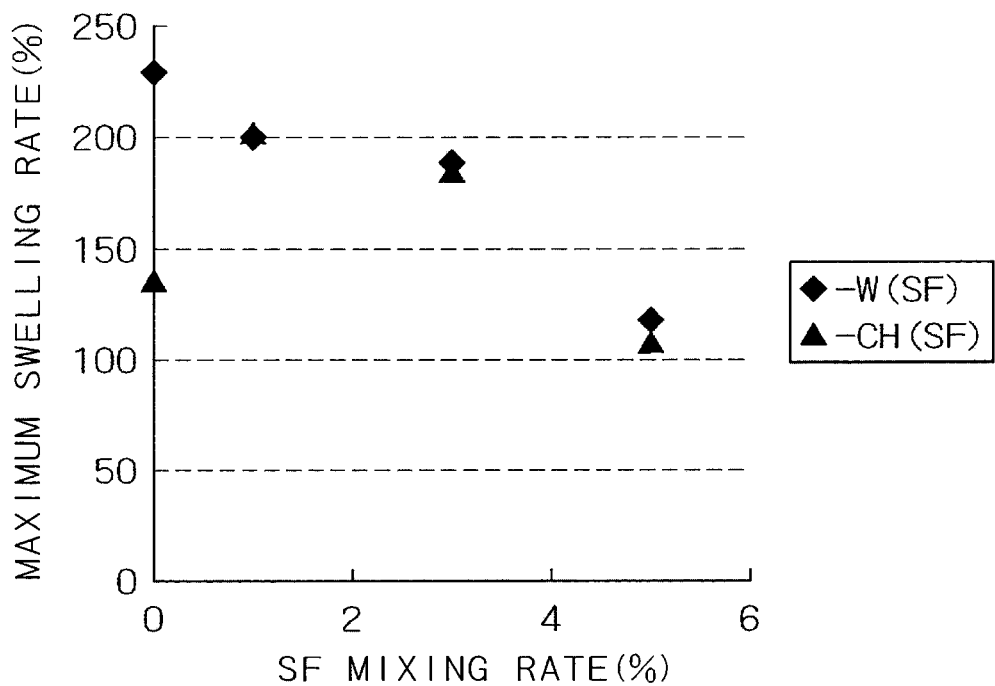
FIG. 3 is a graph showing the relation between the FA mixing rate and the swelling rate under the saturated calcium hydroxide solution conditions.

Test results are listed in Table 2 and also shown in FIGS. 2 and 3.

TABLE 1

| | | MATERIAL | | | SET VALUE | | TEST RESULTS |
|---|---|---|---|---|---|---|---|
| | | MIXTURE RATIO (% BY WEIGHT) | | | MOISTURE CONTENT | DRY DENSITY | MAXIMUM SWELLING |
| No. | SPECIMEN | Be | FA | SF | (%) | (g/cm3) | RATE (%) |
| 1 | Be-W | 100 | 0 | | 21.0 | 1.30 | 227.3 |
| 2 | BeFA-15W | 85 | 15 | | | | 194.9 |
| 3 | BeFA-30W | 70 | 30 | | | | 94.1 |
| 4 | Be-CH | 100 | 0 | | | | 134.6 |
| 5 | BeFA-5CH | 95 | 5 | | | | 166.7 |
| 6 | BeFA-10CH | 90 | 10 | | | | 178.6 |
| 7 | BeFA-15CH | 85 | 15 | | | | 172.4 |
| 8 | BeFA-30CH | 70 | 30 | | | | 62.5 |
| 9 | BeSF-1W | 99 | | 1 | | | 200.0 |
| 10 | BESF-3W | 97 | | 3 | | | 188.7 |
| 11 | BeSF-5W | 95 | | 5 | | | 120.5 |
| 12 | BeSF-1CH | 99 | | 1 | | | 200.4 |
| 13 | BeSF-3CH | 97 | | 3 | | | 186.0 |
| 14 | BeSF-5CH | 95 | | 5 | | | 110.4 |

The tests Nos. 1 to 3 and 9 to 11 made it a condition that the distilled water is poured, and the tests Nos. 4 to 8 and 12 to 14 made it a condition that the saturated calcium hydroxide solution is poured. The tests Nos. 2, 3 and 5 to 8 made it a condition that the fly ash is used as the pozzolan substance, and the tests Nos. 9 to 14 made it a condition that the silica fume is used. The tests Nos. 1 and 4 made it condition that no pozzolan substance is included.

Referring to the reference symbols of the specimen in the above table, Be indicates the bentonite, FA indicates the fly ash, SF indicates the silica fume, W indicates the distilled water, and CH indicates the saturated calcium hydroxide solution. Also, each numerical value in the above table indicates the mixing rate (the inner percentage %) of each pozzolan substance. The graphic representation of the test results in the above table in terms of the relation between the maximum swelling rate and the pozzolan substance mixing rate is given in FIG. 2 (in use of the fly ash) and also in FIG. 3 (in use of the silica fume).

As is evident from Nos. 1 and 4, for instance, no pozzolan substance inclusion results in that the presence of calcium ions causes a 92.7% decrease in the maximum swelling rate.

In contrast with the above, as is evident from Nos. 2 and 7, inclusion of 15% by weight of the fly ash is allowed to suppress a decrease in the maximum swelling rate down to a 22.5% decrease even under the calcium ion present conditions.

As is evident from Nos. 9 and 12, Nos. 10 and 13 and the like, inclusion of only 1 to 3% by weight of the silica fume results in that there is almost no decrease in the maximum swelling rate even under the calcium ion present conditions. The absolute value of the maximum swelling rate becomes lower the higher the pozzolan substance mixing rate is, the phenomenon of which is because the pozzolan substance is mixed in terms of the inner percentage so that the bentonite will decrease in absolute content. Judging from this point of view, use of the silica fume is desirable by reason that the small mixed amount thereof is allowed to produce the satisfactory results without any substantial decrease in the absolute value of the maximum swelling rate.

As is evident also from FIGS. 2 and 3, under the calcium ion present conditions, an increase in the maximum swelling rate appears over the range of the mixing rate up to 20% by weight or less in use of the fly ash, or alternatively, up to 5% by weight or less in use of the silica fume, as compared with the case of no pozzolan substance inclusion (or the test No. 4). It is thus desirable that the mixing rate of the pozzolan substance to the bentonite be limited to the range of more than 0 to 20% by weight or less in use of the fly ash, or alternatively, more than 0 to 5% by weight or less in use of the silica fume.

With considerations of not only the absolute value of the maximum swelling rate but also the decreased amount due to the influence of calcium ions, it would be appreciated that the most desirable mixing rate of the pozzolan substance is in the range of 10 to 15% by weight in use of the fly ash, or alternatively, more than 0 to 3% by weight in use of the silica fume.

B. Filler for Engineered Multi-Barriers

The water-blocking filler of the present invention as described the above is suited for the engineered multi-barriers in the radioactive waste disposal facilities anticipated that the sodium type bentonite would undergo the alteration due to the calcium ions leaching out from the cement-based material. It is thus possible to provide this water-blocking filler as the exclusive filler for the engineered multi-barriers.

Figure 4:
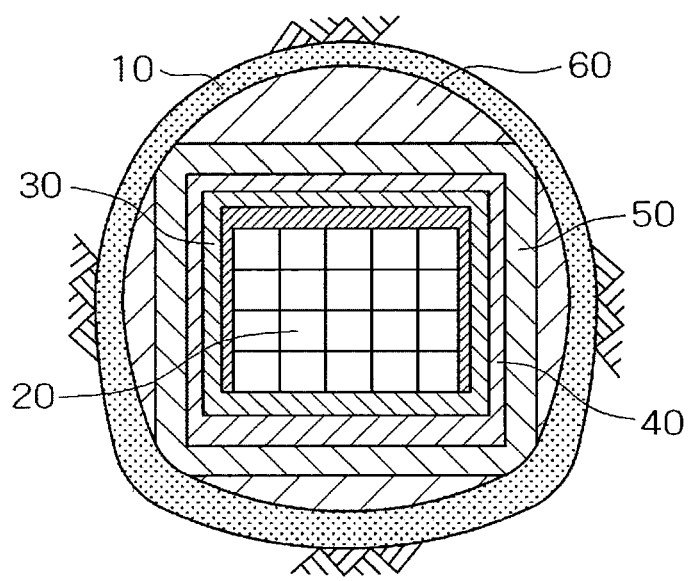
FIG. 4 is a schematic view showing one general structure of an engineered multi-barrier for low-level radioactive wastes.

As shown in FIG. 4, the engineered multi-barrier for use in the subsurface disposal is generally in the form of a structure constructed in an underground tunnel 10 and composed of a concrete pit 30, a low diffusion layer 40, a low water-permeability layer 50 and a back-filling layer 60.

The concrete pit 30 serves as a space to house a radioactive waste 20 and is in the form of a hermetically sealed-up room made of normal concrete.

The low diffusion layer 40 consisting of a cement-based material is arranged on the outside of the concrete pit 30 in contact therewith. Use of the cement-based material (or the material capable of forming concrete, mortar or like cement-hardened substances) is to provide the ensured structural stability against the earth pressure. The term "low diffusion" means a diffusion state in which the radionuclide diffusion gets reduced to as low as $1.0 \times 10^{-12}$ m$^2$/s or below.

The low water-permeability layer 50 is arranged on the outside of the low diffusion layer 40 in contact therewith. Available materials thereof include the filler of non-cement based type mainly comprising the sodium type bentonite in order to utilize the bentonite swelling power mainly for suppression of the underground water and radioactive substance migrations. The term "low water-permeability" means a water-permeability state in which the water permeability gets reduced to as low as $1.0 \times 10^{-12}$ m/s or below.

The back-filling layer 60 is arranged on the outside of the low water-permeability layer 50 in contact therewith. Available materials thereof include a refilling material mainly comprising excavated earth and sand. It is desirable from the point of view of an increase in durability to provide the refilling material in which a hardening material such as cement is held.

In general, the engineered multi-barrier is arranged such that the low diffusion layer 40 consisting of the cement-based material and the low water-permeability layer 50 mainly comprising the sodium type bentonite as described the above are adjacent to each other. It is thus feared that there would be the bentonite alteration (such as the swelling power decrease) caused by the conversion of the sodium type bentonite contained in the low water-permeability layer 50 to the calcium type because of the diffusion of the calcium ions having leached out from the cement-based material of the low diffusion layer 40 by the action of the underground water or the like for very long periods, in which case, however, it can be considered that constructing the low water-permeability layer 50 using the filler for the engineered multi-barriers of the present invention would prevent the swelling power decrease, while ensuring the dynamical stability, and would be thus allowed to provide the low water-permeability layer 50 that exhibits high water-blocking property thanks to the multiplicable effects of the bentonite swelling power and the increased texture condensation caused by the pozzolan reaction.

Figure 5:
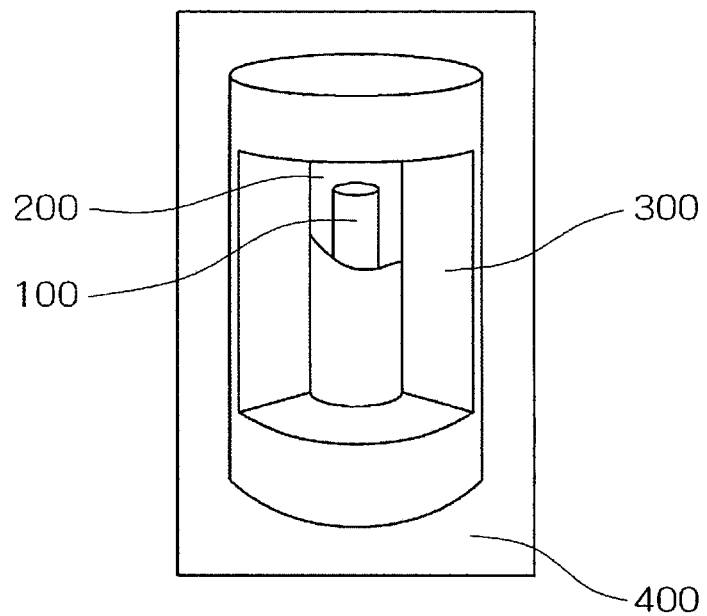
FIG. 5 is a schematic view showing one general structure of an engineered multi-barrier for high-level radioactive wastes.

As shown in FIG. 5, the engineered multi-barrier for high-level radioactive wastes is in the form of a structure composed of a vitrified waste 100, an overpack 200 and a buffering material 300, all of which are placed in a bedrock 400, wherein the above structure is supposed to be buried in the ground deeply as much as 300 m or above from the ground surface.

The vitrified waste 100 has a diameter of about 40 cm and a height of about 1.3 m and is arranged such that the radioactive substances are sealed up in state where they are integrated with the glass in order to prevent the radioactive substances from being easily dissolved in the underground water.

The overpack 200 is in the form of a 20 cm-thick carbon steel container to prevent the contact of the vitrified waste 100 with the underground water until the radioactivity of the vitrified waste 100 gets attenuated to some extent.

The buffering material 300 is in the form of a compacted material made of about 70 cm-thick clay to suppress the underground water and radioactive substance migrations. A bentonite-based material showing the swelling performance and permitting less water permeation is desirably employed as the clay.

In order to support the bedrock 400, shotcrete or like cement-based materials is in use. Thus, the decrease in the swelling performance of the above bentonite-based material due to the calcium ions leaching out from the cement-based material becomes an issue. In this case, however, it can be considered that constructing the buffering material 300 using the filler for the engineered multi-barriers of the present invention would suppress the decrease in the swelling performance of the bentonite-based material, and would be thus allowed to prevent the remarkable decrease in the barrier effects supposed to be produced with the buffering material 300.

EXPLANATION OF REFERENCE NUMERALS

1 . . . Swelling deformation testing apparatus, 2 . . . Specimen, 3 . . . Solution (Distilled water or saturated calcium hydroxide solution), 4 . . . Displacement meter, 5 . . . Steel sheet (Vertical load), 6 . . . Fixing screw, 10 . . . Tunnel, 20 . . . Radioactive waste, 30 . . . Concrete pit, 40 . . . Low diffusion layer, 50 . . . Low water-permeability layer, 60 . . . Back-filling layer, 100 . . . Vitrified waste, 200 . . . Overpack, 300 . . . Buffering material, 400 . . . Bedrock

The invention claimed is:

1. A water-blocking filler mainly comprising sodium type bentonite, wherein more than 1 to 3% by weight or less of silica fume as a pozzolan substance in terms of a percentage by weight relative to a total amount of said sodium type bentonite is mixed with said sodium type bentonite.

2. A method for making an engineered multi-barrier in a radioactive waste disposal facility using the water-blocking filler according to claim 1, comprising:
   providing a low diffusion layer configured to be proximate to the radioactive waste, said low diffusion layer having a proximate and a distal side; and
   providing a layer of said water-blocking filler adjacent to said low diffusion layer distal side.

3. A method for making an engineered multi-barrier in a radioactive waste disposal facility using the water-blocking filler according to claim 1, comprising:
   providing a carbon steel container for the waste; and
   surrounding said container with a layer of said water-blocking filler.

* * * * *